Feb. 16, 1937. S. F. L. VALLET 2,070,937
MEANS FOR CONSTRUCTING BUILDINGS
Filed Aug. 19, 1932 5 Sheets-Sheet 1
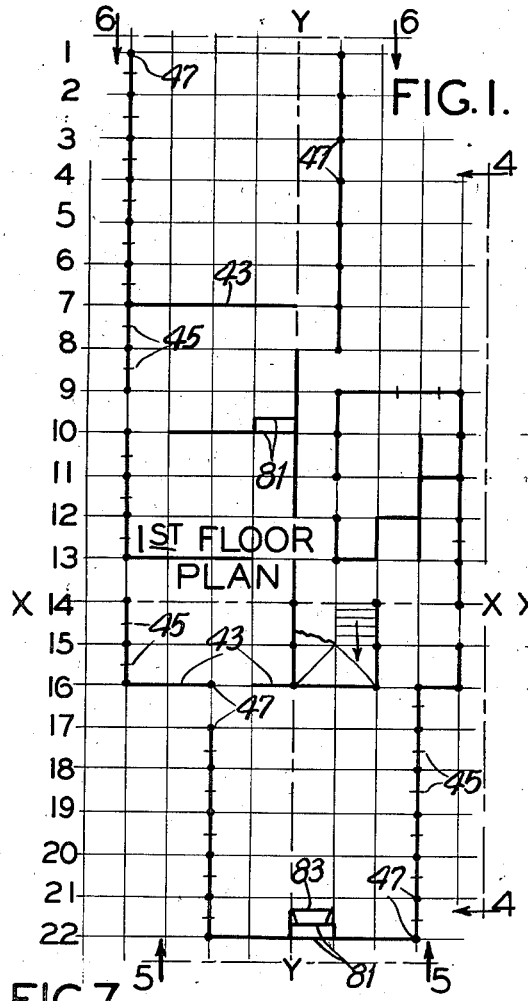
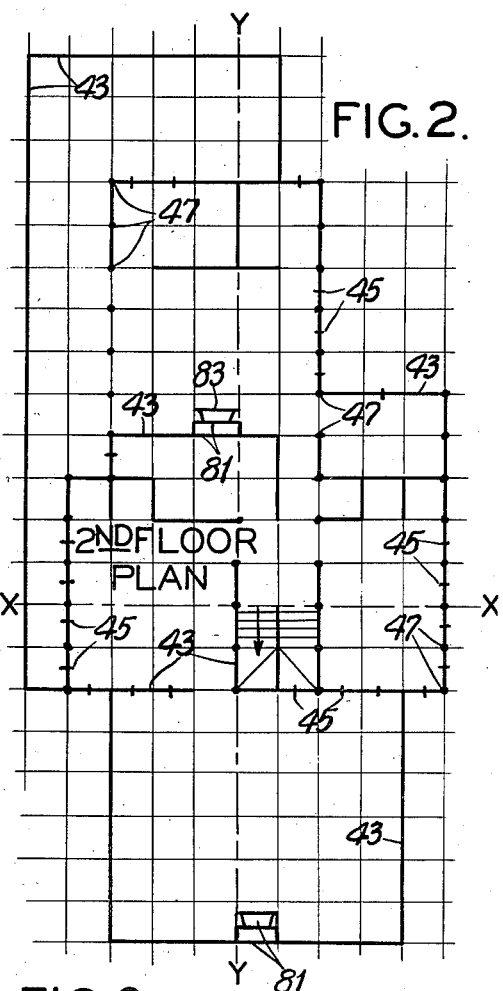
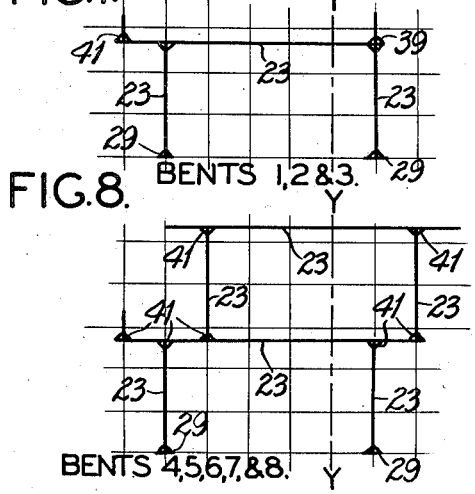
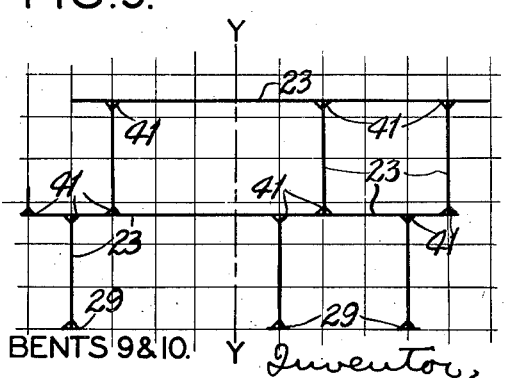

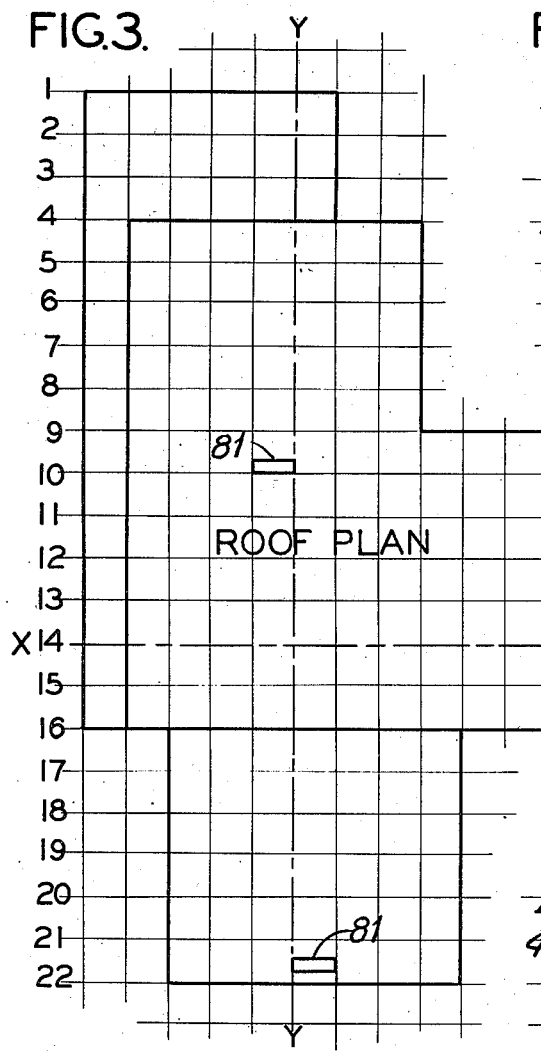
FIG. 3. ROOF PLAN
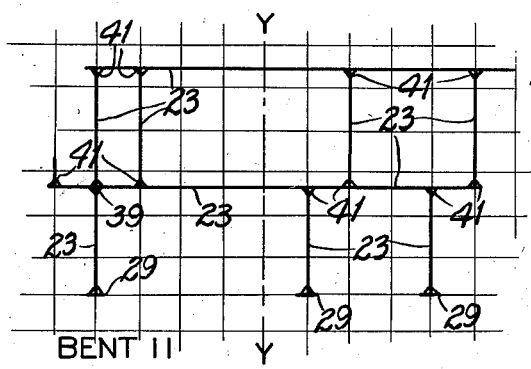
FIG. 10. BENT 11
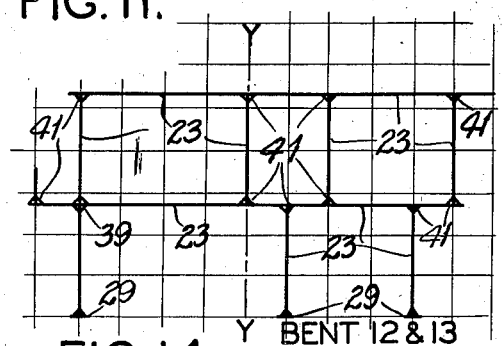
FIG. 11. BENT 12 & 13
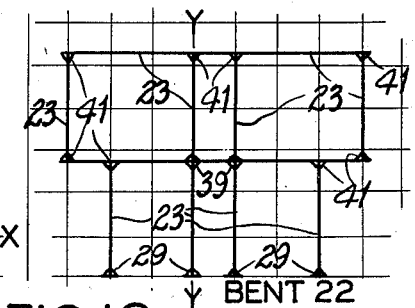
FIG. 14. BENT 22
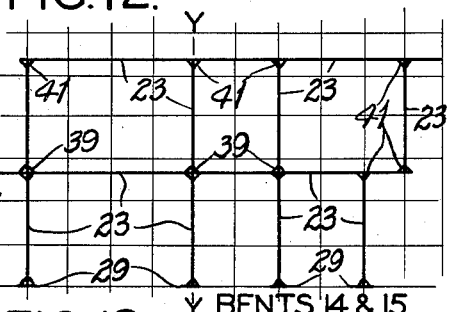
FIG. 12. BENTS 14 & 15
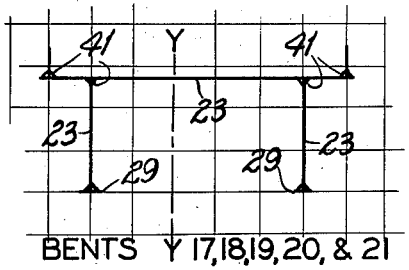
FIG. 13. BENTS 17, 18, 19, 20, & 21

Feb. 16, 1937.   S. F. L. VALLET   2,070,937
MEANS FOR CONSTRUCTING BUILDINGS
Filed Aug. 19, 1932   5 Sheets-Sheet 3

SIDE OF BASIC SQUARE

Inventor,
Stanley F. L. Vallet,
Delos G. Hayes,
Attorney.

Feb. 16, 1937. S. F. L. VALLET 2,070,937
MEANS FOR CONSTRUCTING BUILDINGS
Filed Aug. 19, 1932  5 Sheets-Sheet 4
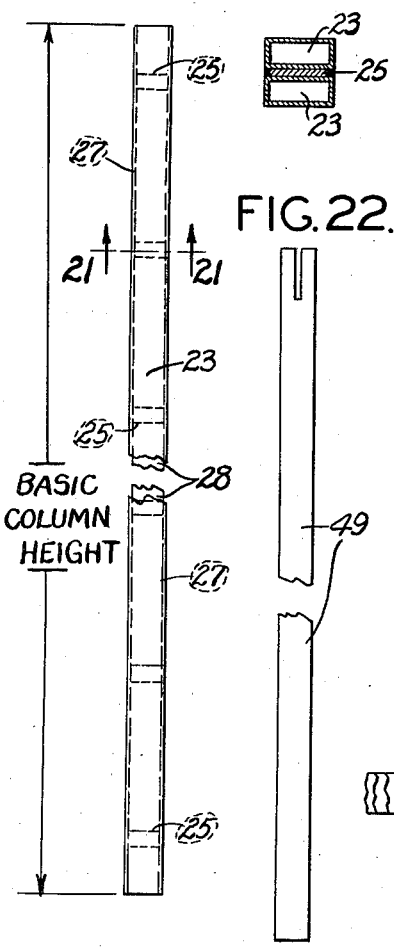
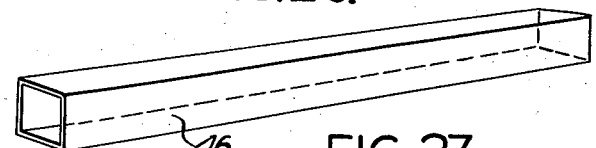
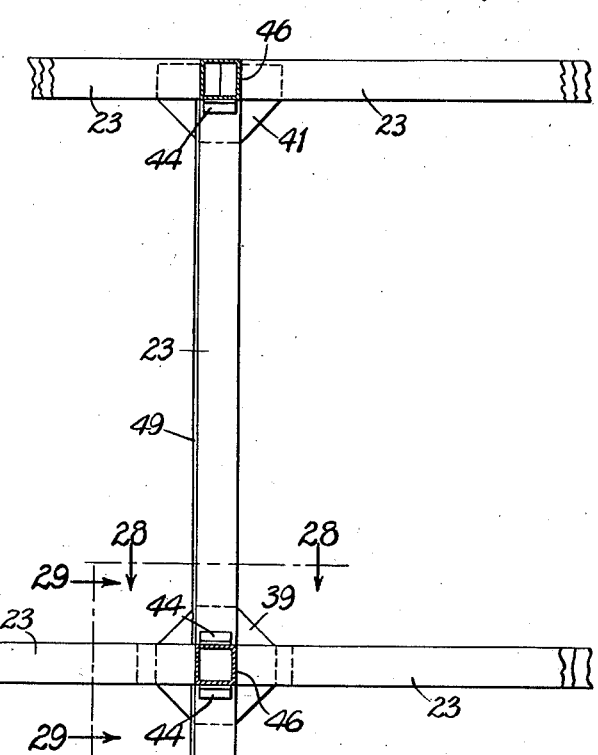
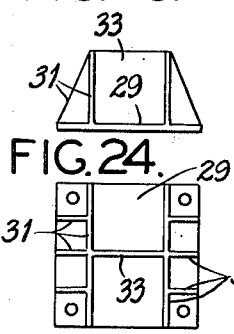
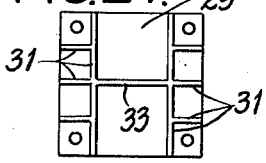
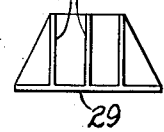
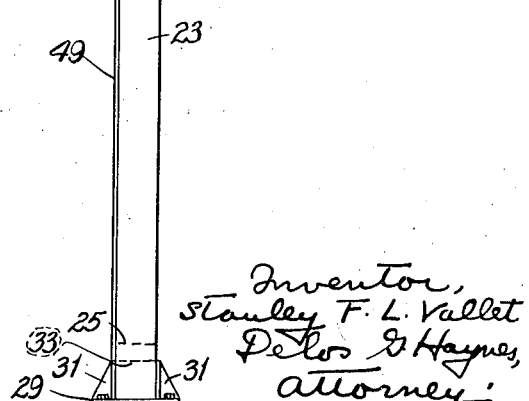

Feb. 16, 1937.   S. F. L. VALLET   2,070,937
MEANS FOR CONSTRUCTING BUILDINGS
Filed Aug. 19, 1932   5 Sheets-Sheet 5
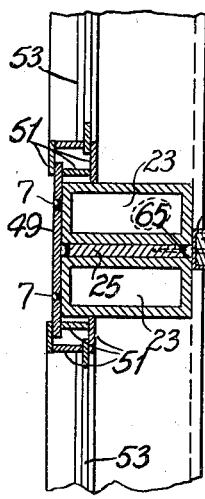
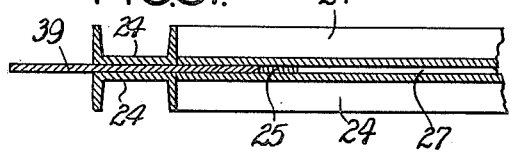
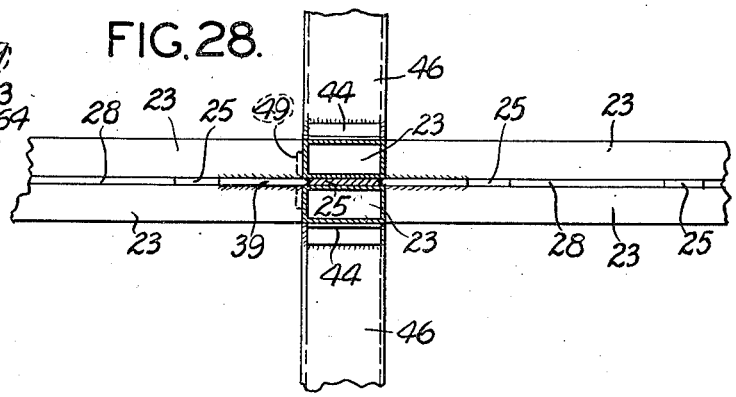
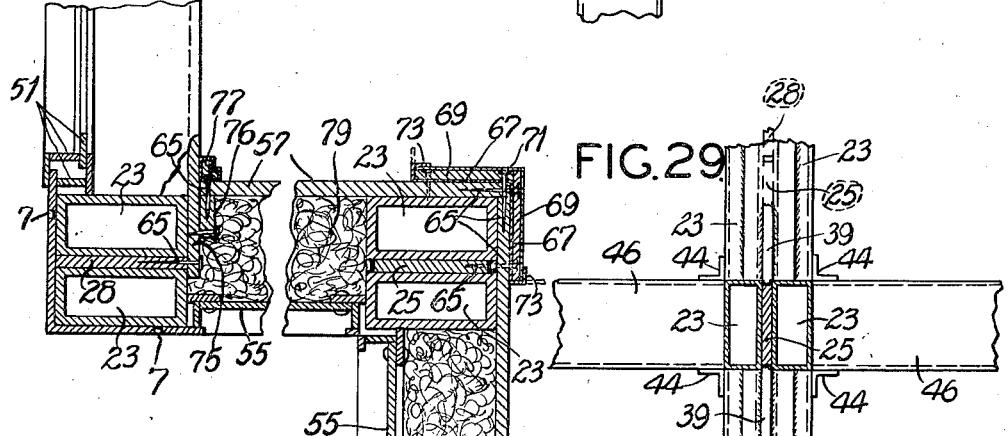
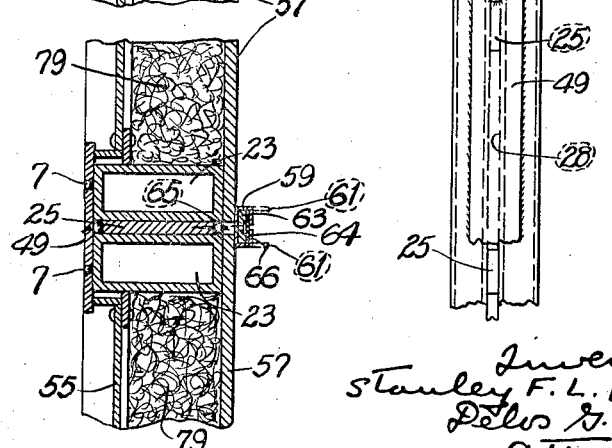

Patented Feb. 16, 1937

2,070,937

UNITED STATES PATENT OFFICE 2,070,937

MEANS FOR CONSTRUCTING BUILDINGS

Stanley F. L. Vallet, St. Louis, Mo.

Application August 19, 1932, Serial No. 629,426

4 Claims. (Cl. 189—1)

This invention relates to a method of, and means for constructing buildings and with regard to certain more specific features to a building construction wherein a series of elemental pieces are provided by a factory according to an improved method to be assembled into rigid-frame bents at the site of the building.

Among the several objects of the invention may be noted the provision of a building construction adapted to effect acceleration of planning and erection without sacrifice of beauty or of flexibility of choice of arrangement; the provision of a construction of the class described which lends itself to the effectuation of more spacious and unobstructed interiors; and the provision of a construction of the class described which is strong and safe but withall economical. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a first floor plan view of an exemplary structure embodying the invention, the same being superimposed upon unit squares (shown in light lines), said squares being used in planning;

Fig. 2 is a view similar to Fig. 1 showing a second floor plan view of the same structure;

Fig. 3 is a view similar to Fig. 1 showing a roof plan of the same structure;

Figure 4:
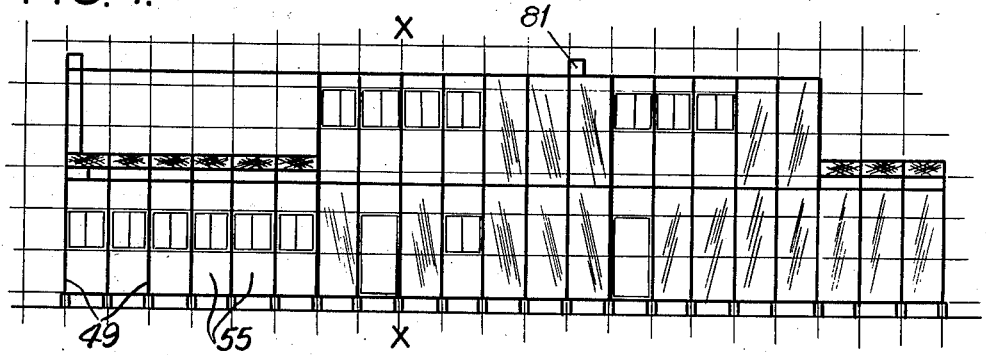
Fig. 4 is a diagrammatic front elevation viewed along line 4—4 of Fig. 1, the same being superimposed upon said unit squares.
Figure 15:
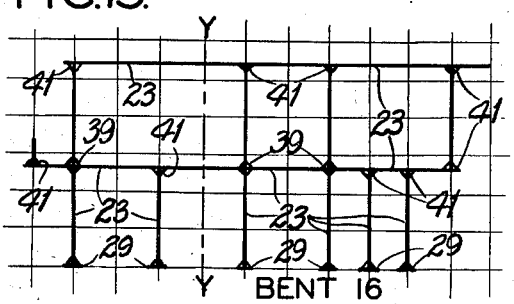
Figure 18:
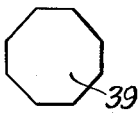
Figure 19:
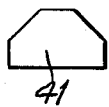
Figure 16:
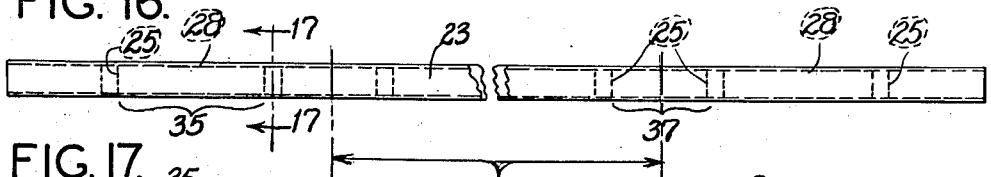
Figure 17:
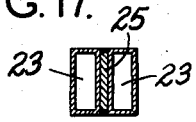

Fig. 7 is a diagrammatic section showing lateral structural sections of the building which is shown in Figs. 1 to 3, said sections illustrating structural bents 1, 2 and 3 which appear at numerals 1, 2 and 3 in said Figs. 1 to 3;

Fig. 8 is a view similar to Fig. 7 but showing bents 4 to 8;

Fig. 9 is a view similar to Fig. 7 but showing bents 9 and 10;

Fig. 10 is a view similar to Fig. 7 showing bent 11;

Fig. 11 is a view similar to Fig. 7 but showing bents 12 and 13;

Fig. 12 is a view similar to Fig. 7 but showing bents 14 and 15;

Fig. 13 is a view similar to Fig. 7 but showing bents 17 to 21;

Fig. 14 is a view similar to Fig. 7 but showing bent 22;

Fig. 15 is a view similar to Fig. 7 but showing bent 16;

Fig. 16 is a side elevation of an exemplary beam;

Fig. 17 is a cross-section taken on line 17—17 of Fig. 16;

Fig. 18 is a detail showing a gusset or joint plate;

Fig. 19 is a view similar to Fig. 18 showing another form of gusset or joint plate;

Fig. 20 is a side elevation of a basic column;

Fig. 21 is a cross-section taken on line 21—21 of Fig. 20;

Fig. 22 is a side elevation of a cover plate for the column of Fig. 20; the same being for exterior first story use;

Fig. 23 is an end elevation of a shoe to be used as a footing for the columns;

Fig. 24 is a plan view of Fig. 23;

Fig. 25 is a side elevation of Figs. 23 and 24;

Fig. 26 is a perspective view showing a horizontal strut;

Fig. 27 is an enlarged detail showing certain structural features of assembly;

Fig. 28 is a horizontal section taken on line 28—28 of Fig. 27;

Fig. 29 is a vertical section taken on line 29—29 of Fig. 27;

Fig. 30 is a typical horizontal section taken through a wall of a building embodying the invention; and, Fig. 31 is a view similar to Fig. 28 showing an alternative structure.

Similar reference characters indicate corresponding parts throughout the several views of the drawings.

Heretofore most buildings have been specifically planned and subsequently the erection executed by cutting and fabricating material at the site of the building, or by cutting and fabricating the special parts and/or assemblies at factories, or by so-called ready-cutting a complete building or substantial part to suit a particular plan.

The above methods have the disadvantage of introducing tedious planning with more liability of disagreement and mistake, and excessive delays occur, particularly if variability of design is desired; or on the other hand, if a complete plan is ready cut so as to avoid error, it soon becomes hackneyed when repeated even only a few times. By means of the present invention these difficulties are avoided by effecting a relatively limited number of basic structural parts which can, by relatively simple procedure be adapted to an infinite number of building forms, the same variably fitting into a preconceived, systematic layout which may nevertheless be varied in effect. The invention simplifies planning and construction and reduces cost without sacrifice of originality or quality. In fact the quality is improved, inasmuch as the most scientific steel construction may be readily adapted to small buildings.

It is to be understood in the following that specific embodiments of the invention have been set forth in order to comply with the statutes requiring a full and clear disclosure; but it is to be understood that other embodiments and methods of carrying out the invention claimed may be employed.

The invention in general consists of a series of rigid-frame bents spaced at equal distances with unit panels fitted between the frames. Each rigid-frame bent is defined as at least two upright columns supporting a substantially horizontal beam, the columns and beam being rigidly fastened by means causing the beam to resist its load otherwise than by a simple beam reaction. By a fully rigid-frame bent herein is meant one in which every joint between main members is capable of developing the full strength in bending of each of said main members it joins together. The panels endwise of the bents are perpendicular thereto and positioned therebetween. Exterior panels serve as walls and carry transverse wind loads to the frames, and the frames resist the transverse wind loads by means of rigid joints. The frames or rigid-frame bents comprise primary members which are rigid in themselves. These rigid-frame bents consist of a plurality of columns mounted by at least one beam rigidly joined together in such a manner than when any column or beam is deflected by a load, all of the other columns and beams are forced to aid the deflected member in resisting that load to an extent depending upon their relative stiffnesses.

Studs are set in the rigid-frame bents so that the same size of wall panels may also be set in end bents. The panels in the end bents then carry longitudinal wind loads to the columns and floor beams of the end bents so that longitudinal wind loads are resisted by front and back walls which act as solid diaphragms rooted to the foundations.

The rigid-frame bents consist of columns, floor beams and rigid joints. The columns are made in one story, two story or three story and perhaps several lengths to meet special conditions The columns are all of the same section. Floor beams are made to span multiple lengths of the distance from center to center of columns, from one panel length up to a maximum economical span length. Floor beams are all of the same section. Joints may be either part of columns or of floor beams. Thus from a minimum number of standard stock parts a large variety of frames may be erected.

Exterior panels may be of cast or stamped sheet metal bolted to frames, sheet steel bolted, or welded to frames, or they may be frames of Z sections with muntins so that spaces between muntins may be glass or sheet metal at will. Outswinging casement windows or door frames are to be parts of the exterior panels where required.

Interior panels are to be sheets of wall and ceiling material held in place vertically and transversely by strips, which are nailed, bolted or fastened to frames by wood screws.

Finally, the structure is to be laid out on the same geometrical basic unit as to length, width and heighth, so that utility ducts, flues, windows and doors, and ornament may be integrated with greater success.

Referring now more particularly to Fig. 1, there is shown in light lines a basic layout of unit squares which, in the present example of the invention, are, to scale, three feet six inches on a side. These squares consitute the basic geometric figures upon which various designs may readily be laid out. Ordinarily they are intended to be printed or otherwise placed upon the drafting paper to be used for tentative sketching and/or executing plans. Their actual size is immaterial, but after scaling their size should be that which is most convenient in the general practice of architectural engineering. I have found that the said figure of three feet six inches is a practicable one.

Numerals 1 to 22 indicate the lateral lines for effecting said squares, and said lines and numerals carry into Fig. 2. In Fig. 3 they are repeated to show the relationship between said Figs. 1, 2 and 3. In order to further aid in showing said relationship between Figs. 1, 2 and 3, axis lines X—X and Y—Y have been drawn for purposes of referring said figures, one to the other.

In Fig. 20 is shown the structure of the basic column. This column comprises two longitudinal members 23. These members 23 may have a cross-section of any desired form such as an abutted channel section or the box section shown. An example of abutted channel sections 24 is shown in Fig. 31. They are preferably composed of metal, although other suitable building materials may be used. These sections are jointed to one another by batten plates 25 welded or otherwise affixed to the members 23 at suitable intervals (Fig. 20). Thus intermediate, flat openings 27 are left into which wood nailing strips 28 may be wedged as a filler in order to effect application of a suitable interior paneling for forming interior walls. The details of this will be set forth below.

In Fig. 16 is shown a basic beam detail which construction serves both for ceiling, floor and other beams. The basic beams are also made, for example, by juxtaposing steel tubing 23 of box or other section held together by batten plates 25 spaced at intervals and having nailing strips 28 therein. The batten plates are fastened in the manner described in connection with the basic columns shown in Figs. 20 and 21.

The structural difference between the basic columns and basic beams is in the spacing of the batten plates 25. In the case of the basic columns the batten plates 25 are spaced at any suitable, predetermined intervals such that proper basic height of columns may be formed, the length of course depending upon the height of room involved.

In the case of the basic beams the batten plates are spaced at alternately longer and shorter intervals numbered 35 and 37 respectively in Fig. 16. The short interval spaces are adapted to receive therein where required the gusset plates 39 or 41 (Figs. 18 and 19); whereas the long interval spaces receive the wedged wood nailing strips, if desired. The distance between the centers of the short intervals is equal to the side of one of said basic squares, namely three feet, six inches.

The reception of the gusset plate 39 is shown in the center of Fig. 27, and the reception of a gusset plate 41 is shown at the top of said Fig. 27. Figs. 28 and 29 also make this clear. From these it may be seen that in order to assemble a column with one or more beams, gusset plates such as 39 are slipped into the bifurcated portions 37 of the basic beams and welded into position at the shop. The beams thus equipped are sent out and at the building site are brought into position over the columns, the gusset or joint plates being fitted down into the bifurcated column ends and welded. In connection with the welding feature, it is to be understood that the fastening may also be made by means of rivets, bolts or the like fastened to predetermined openings. It is also to be understood that rigid brackets may be substituted for the gussets or joints 39, 41.

As shown in the drawings, the beams may be made from one span to several spans in length whereas columns are only one story in height in the example. Spans are multiple lengths of the side of basic square, namely of three feet, six inches. The beams are designed for a maximum span consistent with economy and the maximum desirable width of room. In the illustrated case said maximum span is five panels at three feet, six inches, which equals seventeen feet, six inches. Columns may also be made in one and two story heights.

In Figs. 23 to 25 is shown a shoe having a bottom slab 29 with suitable bracing webs 31 and a central lateral web 33. The web 33 is adapted to fit between the box sections 23 of a column and below the lowermost batten plate 25, as shown in Fig. 27. The shoe is designed to fix the base of the column to a pedestal or other foundation. Other means may be used for fixing lower ends of columns to foundations.

Columns and beams are made up by cutting raw material to the designated lengths and fastening by the batten plates. These assembled units are carried in stock. Upon demand the storekeeper withdraws from stock the proper beam units and applies joint plates 39 and/or 41. These assemblies are sent to the site with the columns and erected by welding or otherwise fastening as above made clear. This gives the most reliable weld (the shop weld) where it is most needed, thus improving strength and durability.

Simple and compound bents or structures effected by fastening with gussets basic column and beam material are shown in Figs. 7 to 16, the same referring to Figs. 1, 2 and 3, as indicated in the schedule of figures above set out. In Figs. 1 and 2, the heavy dots at the corners of certain of the basic squares represent placed columns 47. The heavy lines 43 represent walls. The small cross-lines 45 represent windows. No beams are illustrated in Figs. 1 and 2, these being illustrated in Figs. 7 to 15. It will be understood that the bents illustrated in said Figs. 7 to 15 are positioned cross-wise from left to right on the Figs. 1 and 2 according to the schedule of numbers 1 to 22 noted on those figures, when taken in connection with the corresponding numbers noted on Figs. 7 to 15.

As above made clear, the basic column and beam material is fabricated in proper lengths from properly cut material lengths (which are multiples of the sides of said squares) and held for order. Or, stock lengths may be made up as ordered. That is, the material is fabricated before planning of the buildings into which it goes but according to a predetermined geometric schedule to which the building plan conforms according to desired variations. Assembly of the rigid-frame bents or structures illustrated in Figs. 7 to 15 are performed at the sites of the building operations.

As indicated in Figs. 7 to 15, the basic column height taken in this example is two and two-thirds times three feet, six inches (the side of a basic square) which equals nine feet, four inches. This is to be taken only as exemplary as to what room height may be predetermined. This predetermination may be made for long periods of production and a variety of predetermined lengths may be kept in stock or cut and assembled from raw material as orders are received. In general, the height is preferably to be geometrically related to length and width so as to form a mathematical basis for decoration of interior panels.

As to the basic beams, the distance between the openings adapted to receive the gussets is the basic square breadth, namely, three feet, six inches, (for example) as indicated in Fig. 16.

Now it is known that the ordinary purchaser of a building is more desirous of variety in the length and width of rooms than in height thereof. Thus while only a few or perhaps only one basic column length is made up, a number of basic beam lengths which are multiples of three feet, six inches (or any other length determined upon) are kept in stock or made up. For instance, beams of lengths as follows may be kept: twenty-one feet; twenty-four feet, six inches; twenty-eight feet; thirty-one feet, six inches; thirty-five feet.

From the above it will be seen that the columns and beams are made to, and do lie in planes forming rigid-frame bents made of material of predetermined form and length ready to be assembled into said bents at the site of the building. The predetermination of the length according to a basic calculation, results in there always being formed rigid-frame bents whose dimensions and areas are predictable ratios of one another, so that they may be readily fabricated to accord with plans which are sketched on the cross-sectional lines forming the three-foot, six inch squares above referred to.

There is thus effected a series of rigid bents 1–22, said bents spaced apart in parallel relationship along the lines corresponding to numerals 1 to 22. In order that these bents may be suitably supported laterally and spaced from one another, I provide basic struts such as shown, for example, in Fig. 26. These struts 46 are formed in lengths substantially equal to or multiples of the three-foot six-inch length, determined upon as basic, and are held in position between the bents by means of angle irons 44, suitably welded or otherwise fastened into position. These struts 46 are shown in Fig. 27. It will be understood in connection with the struts 46, that while they are shown as being of box-sectional, tubular construction, they may be formed otherwise, as of a compound channel shape or otherwise. Other fastening means of the class described may also be used. It is to be understood that the strut of Fig. 26 is an interior one, but exterior ones differ only in detail.

After the various bents 1 to 22 have been set up in parallel arrangement and joined together by means of the struts 46, according to a floor plan (such as for example that shown in Figs. 1 to 3 and in the elevational details shown in Figs. 7 to 15) there results a metal framework requiring the application of a suitable panel structure for completing the walls, partitions, and the like.

Figure 5:
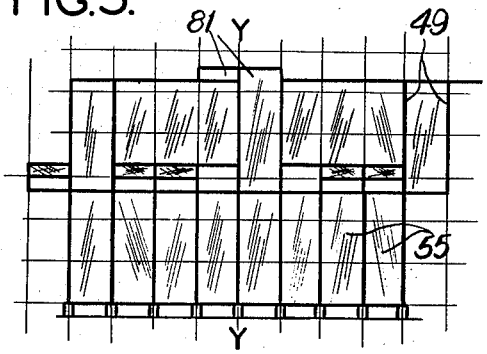
Fig. 5 is a view similar to Fig. 4 but showing an end elevation viewed along line 5—5 of Fig. 1.

Standard exterior and interior panels 55 are applied to the outer legs or columns of the bents so that said outer legs become an integral part of long exterior walls. Where buildings are more than one room in width, that is, being more than five panels wide, bents having interior legs or columns are used, and standard interior wall panels are applied to said interior legs to form interior partitions (Figs. 1 and 9). Studs are set in the end bents and standard exterior and interior panels are applied to said studs to form end exterior walls (Figs. 5 and 15). That is, all panels are of the same size and if a column is not available for fastening, a stud is placed to be so available. The same or similar studs are set in intermediate bents where desired and standard interior panels are applied to them to form lateral interior partitions.

Where buildings are more than one room in width but the total width is not more than five panels, the above partition studs are also used for longitudinal interior partitions.

Figure 6:
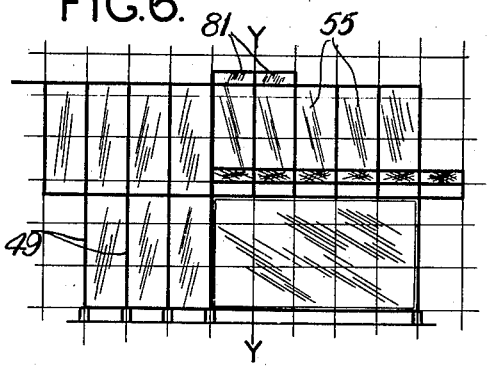
Fig. 6 is a view similar to Fig. 4 but showing an opposite end elevation viewed along line 6—6 of Fig. 1.

Figs. 4 to 6 show elevations which indicate such panels in place and Fig. 30 is a detailed horizontal section illustrating how certain ends are to be accomplished.

The exterior basic columns are provided with cover plates 49 welded or otherwise fastened into position to cover the space between the box sections 23. If no window is used in a given section, the frames 51 may be used to support an outside closed panel 55. (Fig. 30.)

Where windows or doors are required special panels are used of which the windows or doors are an integral part. For instance in the illustrative case all panels have an exterior frame 51 in which may be fastened metal or fiber sheeting for closed panels, metal or fiber sheeting and windows, for window panels, and doors for door panels. These panels are also stock parts held for order and set in place after rigid-frame bents are erected at the site. Panels are fastened in place by welding to the faces of the columns and struts, as at numeral 7, or by means of bolts, clamps, or the like, if desired.

Interior panels are composed of decorative material to suit the taste of the occupant and may comprise any of various substances, such as wood, wallboard or the like. Wallboard is illustrated at numeral 57 and this is held in position by a metallic strip 59 which originally had the shape indicated at dotted lines 61. Into this channel shape is placed a wood strip 63 through which nailing is accomplished by nails 65 into the strip between the tubular sections of the column. Then a flat strip 64 is placed over the nail head and the sides 61 are bent over into the solid line position 66 shown in Fig. 30. There thus results an interior of neat finish.

At convex corners corresponding angular members 67 may be used with interior wood strips 69 nailed into the nailing strips and/or edges of the panel 57, the same being covered by metallic corner pieces 71 held in place by flanged-over portions 73 of said corner pieces 67.

As to the concave type of corner, the interior wall panel extends as at numeral 75 so that panel may be nailed direct to the nailing strip 28. This panel carries a nailing strip 76. To these strips of wood is nailed the abutting panel 57. A bead 77, corresponding in construction to those already described, is nailed to the wood 76 and laps the adjacent panel 57. It will be understood that variations of this strip may be effected according to location.

The gussets 41 are class examples of members which develop substantially the full resisting strength in bending of the columns of the bents when the beams thereon are loaded; whereas the angle members 44 are class examples of members which do not develop said bending strength by means of loads on the lateral struts between bents.

If desired, insulation 79 may be used between the interior and exterior panels as illustrated.

As to the flooring, roof, and the like, these may be positioned across the struts and beams already described and fastened to the nailing strips in the beams and/or otherwise suitably fastened. They may be made in stock parts in units.

One of the advantages of this invention is that the columns, beams and struts are all formed in lengths which are substantial multiples of the length of the sides of a predetermined basic figure, such as the square shown. Thus, a building may be exceedingly easily designed. The design is accomplished by providing the user of the proposed building with paper sectionalized according to the predetermined squares, as shown in Figs. 1, 2 and 3. The user then sketches on these the shapes of the rooms and positions of the same, according to his requirements. This he does for the various floor plans, and it is only necessary thereafter to examine the layouts he thus makes to see that they are congruous and examine the respective sections (which may be readily drawn) in order to ascertain what shape of frames or bents are required.

The multiple for the columns is preferably fixed and it may be fractional; that for the beams is variable but preferably one of a few whole numbers; and that for the struts is preferably one. The outside and some inside paneling being of metal may be made to form sides of chimneys as indicated at numeral 81, the remainders of the chimneys 83 themselves being also of metal if desired. Stacks or chimneys may also be made in one piece of metal lined with fireproofing, and the whole stack set between and fastened to columns.

It will be understood that the paneling in the planes of the bents forming the ends of a structure may be made to match those at the sides of the house by placing columns or other supports such as studding at intervals corresponding to the panel widths, even though these added columns are not required to effect an amply rigid bent.

Advantages of the invention are:

Rigid-frame bents forming the primary braces not only resist wind forces, but cause less deflection in floor beams and make it possible to use lighter floor beams.

A simple structural scheme is effected whereby stresses are transferred to a minimum number of parts. The distance between bents is such that light floor slabs may be used without the necessity of intermediate stringers between the floor beams. Loads are carried by floors and walls directly to the frame bents. It will be understood that floor slabs, roofs, struts and the like are positioned laterally of the bents and form secondary members.

Houses may be planned on the grid of squares the sides of which are the distance between bents. The distance between bents is also such that the width of one unit is sufficient for a passageway and different combinations of unit squares meet amply closely all the room requirements of architectural practice.

A large variety of frame bents may be formed from a very small number of stock parts.

The product is primarily produced in a factory where it can be done most efficiently. Subsequently it is erected at the site.

Low drafting costs are effected by the producer. Homes are planned on a sheet of scaled paper with line diagrams of the bents opposite the plan. Members of the bents, and panels are simply designated by a structural mark. This line diagram is all that is needed to erect any house as the parts arrive at the site tagged or painted with the corresponding structural marks. A copy of the line diagram is sent to the foreman and to the stockroom. The stock room refers to blue prints of standard details and loads the parts on a truck.

Great flexibility is effected. It is a general method of construction, and not a limited number of stock houses. The customer may design his own house.

Because of its structural character the system is highly adaptable to row housing, as well as to individual houses.

Columns are not placed in the interior of a room as in the present method of cantilever construction.

Instead of covering frames with a false exterior, the architectural character is the result of a frank expression of the rigid frame principle. Thus, great economy is achieved by eliminating a costly false covering which does no work, and also a true architectural expression is achieved.

Width of bent herein refers to its dimension parallel to the lines at numerals 1–22 (Figs. 1 to 3).

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A system of building construction comprising a series of parallel bents spaced from one another, each of which is made up of at least two columns supporting at least one horizontal beam, rigid fastening means for joining the component columns and beams of the respective bents adapted to render the bents independently rigid in their respective planes to a degree such that when any member of the bent is deflected in the plane of the bent by a load all of each of the other members of the bent are forced by bending to aid the deflected member in resisting the load to an extent depending upon substantially their relative stiffnesses, said rigid fastening means comprising gussets having planes the material of which is parallel to the planes of the bents, struts spacing said bents and positioned perpendicularly thereto, fastening means therefor comprising angle-holding members having planes the material of which is at right-angles to the planes of the bents, rectangular enclosing panels, the inner shapes of said bents accommodating said panels in whole multiples within the bents, and the spaces between columns of adjacent bents and beneath said struts accommodating similar panels in whole multiples, said fastenings for forming the bents from component members and for joining the struts accommodating said rectangular panels within and between bents.

2. A system of building construction comprising a series of bents spaced from one another, each of which is made up of at least two columns supporting at least one horizontal beam, said bents having corner joints between the columns and beams which render the bents rigid in their respective planes to a degree such that when any member of the bent is deflected in the plane of the bent by a load all of each of the other members of the bent are forced by bending to aid the deflected member in resisting the load to an extent depending upon substantially their relative stiffnesses, said rigid fastening means comprising gussets having planes, the material of which is parallel to the planes of the bents, enclosing panels, the outlines of said bents providing shapes accommodating said panels within the bents, and the spaces between columns of adjacent bents accommodating similar panels.

3. A system of building construction comprising a foundation, a series of parallel bents spaced from one another, each of which is made up of at least two columns supporting at least one horizontal beam, rigid fastening means for joining the component columns and beams of the respective bents adapted to render the respective bents rigid in their respective planes to a degree such that when any member of the bent is deflected in the plane of the bent by a load all of each of the other members of the bent are forced by bending to aid the deflected member in resisting the load to an extent depending upon substantially their relative stiffnesses, said rigid fastening means comprising gussets having planes the material of which is parallel to the planes of the bents, means rigidly joining said bents to the foundation, struts spacing said bents and positioned perpendicularly thereto, fastening means therefor comprising angle members, rectangular enclosing panels, the inner shapes of said bents accommodating said panels within the bents, and the spaces between columns of adjacent bents and beneath said struts accommodating similar panels, said fastenings for forming the bents from component columns and beams and for joining the struts being adapted to accommodate within and between bents of said rectangular panels.

4. A system of building construction comprising a foundation, a series of parallel bents spaced from one another, each of which is made up of at least two columns supporting at least one horizontal beam, said bents having gusset joints between columns and beams which render the bents rigid in their respective planes to a degree such that when any member of the bent is deflected in the plane of the bent by a load all of each of the other members of the bent are forced by bending to aid the deflected member in resisting the load to an extent depending upon substantially their relative stiffnesses, said rigid fastening means comprising gussets having planes the material of which is parallel to the planes of the bents, struts spacing said bents and positioned perpendicularly thereto and angle means for fastening the struts and bents, means rigidly joining said bents to the foundation, rectangular enclosing panels, the shapes of said bents providing shapes accommodating whole multiples of said panels within the bents, and the spaces between columns of adjacent bents accommodating whole multiples of said panels.

STANLEY F. L. VALLET.